Patented May 29, 1934

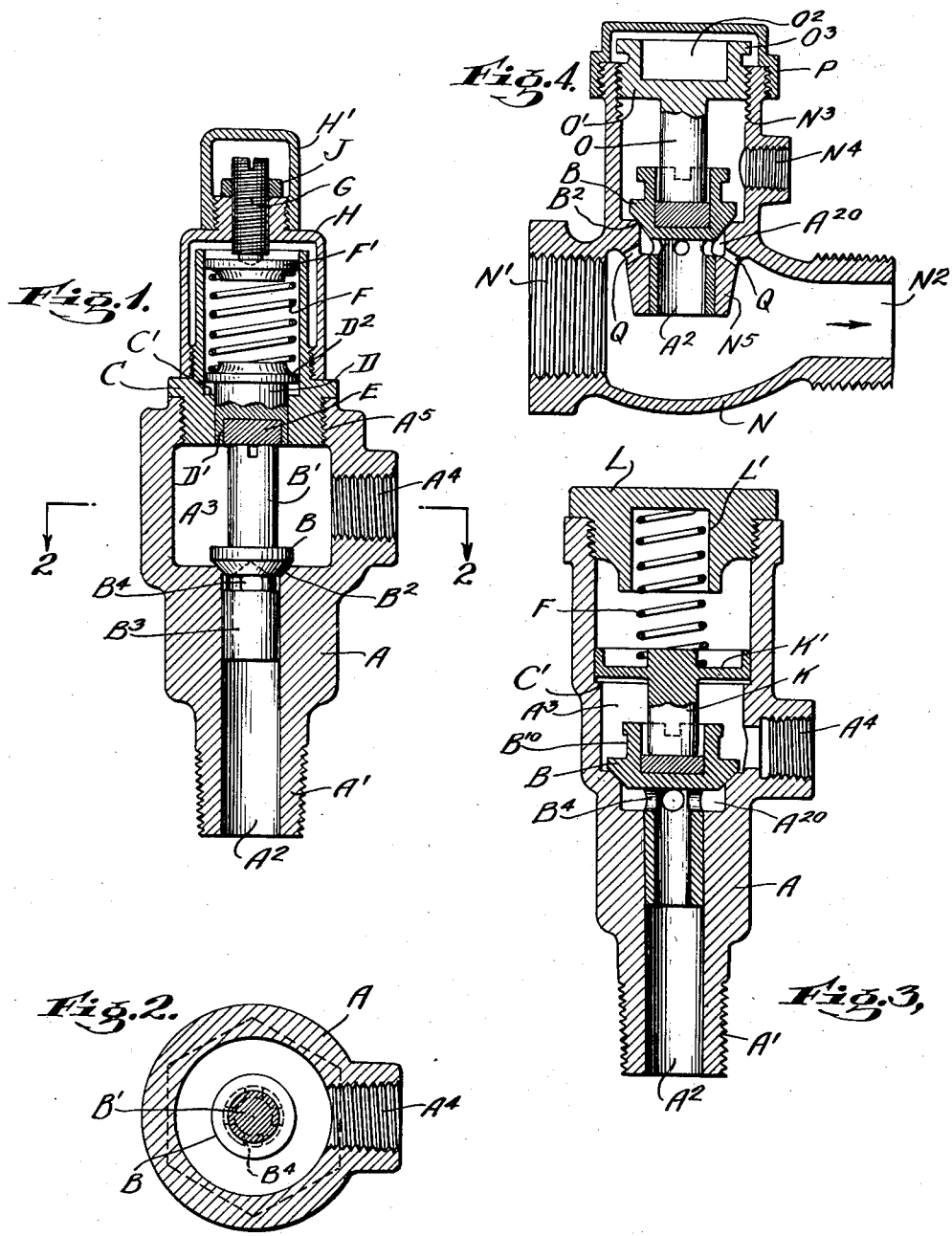

1,960,272

UNITED STATES PATENT OFFICE 1,960,272

RELIEF VALVE

Luther D. Lovekin, Wynnewood, Pa., assignor to Kitson Company, Philadelphia, Pa., a corporation of West Virginia Application September 24, 1928, Serial No. 307,871

15 Claims. (Cl. 137—53)

The general object of my invention is to provide an improved relief valve, and, more particularly, an improved relief valve specially adapted for use in connection with a domestic water heater or tank or boiler.

A more specific object of the invention is to provide a relief valve of the character referred to, with novel temperature responsive means effective to prevent the temperature of the water in the tank or boiler with which the valve is connected, from exceeding a predetermined value.

While such temperature responsive means alone are effective in preventing undesirably high pressures due to the generation of steam in the tank or boiler, they are not effective to prevent objectionable pressure increases not accompanied by a proportionate rise in temperature of the fluid, such as are caused by water hammer or thermal expansion of the liquid when heated with the inlet and outlet connections closed. Another object of my invention is therefore to provide novel pressure responsive means in combination with temperature responsive means to prevent excessive pressures in the tank.

In relief valves for such use it has been customary to provide a fusible disc or body which will melt or soften and thereby yield to permit the escape of hot water from the tank when heated to a predetermined pressure. In accordance with the present invention this disc is so mounted as to normally maintain the disc out of contact with the water in the tank to avoid the objectionable formation of scale on the disc due to impurities in and dirt carried by the water.

It is particularly important in relief valves of the character specified to insure a relatively rapid conduction of heat from the water to the fusible disc, whereby the temperature of the latter at all times approximates that of the heated water in the tank. To the attainment of this result the valve parts are arranged in accordance with the desirable form of the present invention, so that only a thin body of metal is interposed between the water and the fusible disc. In lieu of or in addition to the foregoing arrangement for insuring a rapid heat transfer from the water to the fusible disc, I make the valve casing and parts so relatively massive in construction and so arrange them as to thereby secure a rapid conduction of heat from the water to the disc.

Heretofore it has also been the practice to attempt to protect hot water tanks or boilers of the kind specified against injurious consequence of unduly high water temperatures by the use of pressure controlled relief valves normally biased to a closed position by means of a spring or weight. It has been found, however, that a pressure relief valve, the operation of which depends upon the action of a spring or weight, cannot possibly serve to relieve the pressure of the liquid heated whenever necessary to prevent dangerously high temperatures, since in practice such temperatures may occasionally be obtained with a water pressure in the tank or boiler lower than that required to operate the pressure relief valve since the latter must be adjusted to remain closed under normal tank or boiler water pressures higher than those which may exist when the tank or boiler water temperature becomes dangerously high. This difficulty is avoided, in accordance with the present invention, by the use of a relief valve comprising temperature responsive devices which are independent in their operation of the actual water pressure in the tank or boiler, and which do not interfere with the opening of the relief valve in response to water pressure increases.

A novel characteristic of my combined pressure and temperature controlled relief valve arises from the provision whereby the means normally effective to prevent the valve from opening when the pressure of the fluid is less than a predetermined amount are rendered ineffective to prevent the valve from opening by the thinning of said block which occurs when subjected to sufficiently high temperature.

Further specific objects of my invention are to provide a relief valve in which servicing of the valve is inexpensive and easy; and to provide a relief valve relatively inexpensive to manufacture, simple in construction and operation and the parts of which can be easily and quickly assembled and adjusted for different operating conditions.

The various features of novelty which characterize my invention are pointed out with particularity in the claims annexed to and forming a part of this specification. For a better understanding of the invention, however, and the advantages possessed by it reference should be had to the accompanying drawing and descriptive matter in which I have illustrated and described a preferred embodiment of the invention.

Of the drawing:

Fig. 1 is a transverse sectional view of a valve embodying temperature and pressure responsive means;

Fig. 2 is a section on the line 2—2 of Fig. 1;

Fig. 3 is a transverse section of a modification of the valve shown in Figs. 1 and 2; and Fig. 4 is a transverse view of a valve embodying only temperature responsive means.

Referring first to the valve shown in Figs. 1 and 2, A indicates the valve casing of my improved valve having a threaded portion A' for engagement with a tank or boiler (not shown). The casing is provided with an inlet opening or passageway $A^2$ which communicates with the interior of the tank and opens into a central valve chamber $A^3$. The valve chamber discharges to the atmosphere or to waste through an outlet opening $A^4$ formed in the valve casing at one side of the chamber $A^3$. The flow of fluid through the passageway $A^2$ is controlled by a valve member B having a stem B' and engaging a seat $B^2$ formed at the inner end of the passageway $A^2$. The valve member is provided with a tubular skirt portion $B^3$ having openings $B^4$ therein, which skirt slideably fits in the passageway $A^2$ to guide the valve to and from its seat. A tubular extension C of the valve casing is screwed into a threaded opening $A^5$ in axial alignment with the passageway $A^2$ in the casing A.

A follower plug D having a recess D' at its inner end is slideably mounted in the tubular extension C. A disc of fusible metal E having the desired melting point is positioned in the recess D' with its inner surface contacting with the outer end of the valve stem B'. The valve member B is normally held in its closed position by a spring F mounted in the tubular extension C and adapted to yield to permit the valve B to rise from its seat when the pressure acting against the underside of the valve member exceeds a predetermined amount. The outer end of the plug D is provided with an annular flange or stop $D^2$, the purpose of which is to limit the inward movement of the plug under the pressure of the spring F.

Advantageously, means are provided for adjusting the tension of the spring F and in the construction shown in Figs. 1 and 2 this result is secured by the use of an abutment screw G against which the outer end of the spring F acts through a bearing member F'. The screw G is held in a threaded opening formed in the outer end of a bonnet H threaded onto the extension C. A lock nut J forms a convenient means for securing the abutment screw in any desired adjustment and advantageously, as shown, the outer end of the screw G and the nut J are normally enclosed by a cap H' threaded onto the bonnet H.

In the normal condition of the valve shown in Figs. 1 and 2, the valve member B is held against its seat by the fusible metal disc E follower plug D, and spring F. Heat is conducted to the disc from the water in the hot water heater tank with which the valve is used through the valve body A, tubular extension C and plug D and through the movable valve member B all of which are preferably made sufficiently massive and consequently of sufficient heat conductivity to normally maintain the disc E at a temperature approximating that of the water in the tank. Preferably the tension of the spring F exerts a valve closing tendency exceeding the valve opening tendency of the normal tank pressure. Consequently when the water temperature rises to a predetermined value fixed by the composition of the metal disc E, the latter softens somewhat and the metal of the disc is squeezed out around the valve stem B' due to the pressure of the spring F on one side and the water pressure on the other side of the disc. The pressure of the spring on the disc is soon relieved by the shoulder $D^2$ engaging the shoulder C' on the valve casing extension. The valve member cannot be unseated until after this engagement of the limiting stop. On a further softening of the disc, the pressure in the tank is sufficient to unseat the valve to permit a sufficient escape of water from the tank. The fusible disc can be easily and quickly renewed after each operation of the relief valve in response to temperature increase.

When the water pressure in the tank or boiler exceeds that required to over-balance the valve closing tendency of the spring F, the valve member B lifts and permits the escape of water from the tank and thereby relieves the excess pressure in the latter regardless of the cause for the excess pressure. If the excess pressure is not due to excess temperature, as will ordinarily be the case, the disc E will not be affected by the water flowing past the valve when the spring F yields. When the water pressure in the heater tank falls to its normal value the valve member B will seat and the valve mechanism will thereby be restored to its initial condition and will be again effective to protect the tank against excessive temperature or pressure conditions therein.

In the modified form of the combination of temperature and pressure responsive means shown in Fig. 3, the fusible disc is maintained at substantially the tank water temperature other than by a massive construction of the valve casing and parts. In this construction the passageway $A^2$ has an enlarged portion $A^{20}$ at its outer end and in which the openings $B^4$ in the skirt $B^3$ are normally positioned. The valve member B is provided at its outer side with a tubular extension $B^{10}$ in which the fusible disc E is positioned. The disc E is held at the bottom of the tubular extension by a piston or follower plug K slideably mounted in the valve casing and having an annular flange K' at its outer end, with which the spring F contacts.

In this construction a threaded cap member L is screwed into the upper end of the valve casing and provided with a recess L' at its inner side in axial alignment with the plug K and passageway $A^2$. The spring F is received in the recess L' and the tension of the spring can be adjusted by adjusting the position of the cap in the valve casing.

The valve of Fig. 3 responds to an undue increase in temperature in exactly the same manner as the valve of Figs. 1 and 2 and the valve member is not unseated until after the disc is sufficiently melted to permit the flange K' to contact with an annular shoulder C' formed in the valve casing slightly spaced from the flange. While the fusible disc receives a portion of its heat by conduction through the valve casing, a substantial portion is received by contact of the fluid with the inner surface of the valve member. The enlarged passageway portion increases the amount of surface contact. The valve member responds to excessive pressure increases not due to excessive temperatures in the same manner as in Figs. 1 and 2.

The relief valve of Fig. 3 is more simple in construction and requires fewer operating parts than the valve of Fig. 1. The arrangement of the fusible disc normally out of contact with the water but separated therefrom only by a thin metal wall of the valve member, insures the maintenance of the fusible disc at a temperature approximating that of the water in the tank.

In the modification shown in Fig. 4, the relief valve is incorporated in a T-shaped pipe coupling N having a threaded passageway N' at one end and an externally threaded passageway N² at its opposite end. The coupling is provided with a tubular extension N³ in which the relief valve is mounted and has a discharge opening N⁴ at one side thereof. The valve member B is mounted in and seats against a valve seat B² formed on the outer side of an integrally formed depending portion N⁵ of the coupling.

The valve member, fusible plug and enlarged passageway portion A²⁰ are constructed and arranged in substantially the same manner as in Fig. 3. The present valve construction however is provided with temperature responsive means only and the fusible plug and valve member are held in their normally seated position by a plug O having a flanged tubular outer end portion O' in threaded engagement with the tubular extension N³. A square socket O² is provided in the outer end of the portion O' whereby the position of the plug O may be adjusted in the extension. The portion O' is also provided with an annular shoulder O³ which is adapted to contact with the upper surface of the extension N³ and thereby limit the movement of the plug toward the valve member. This construction prevents the member O from being screwed inwardly in the valve body to such an extent as to hold the valve member in its closed position when the fusible disc is not in place. A cap P having a screw threaded engagement with the extension N³ as shown is adapted to conceal the outer end of the member O and prevent tampering therewith.

In this construction as in that of Fig. 3 the fusible disc is normally maintained out of contact with the water in the coupling and separated therefrom by the thin metal wall constituting the bottom of the valve member B. There is a tendency for the formation of an air pocket or dead air space in the enlarged portion A²⁰ of the passageway A² in the valves of Figs. 3 and 4 which would lower the heat transmission to the fusible disc and prevent the maintenance of the disc at a temperature approximating that of the main body of water. Advantageously, means are provided for preventing the formation of such air pockets and in the present application such means consist of passages Q connecting opposite sides of the space A²⁰ with the pipe chamber. With this construction a circulation of water is normally maintained through the passageways Q and A² which sweeps out any air collecting in the portion A²⁰. If desirable the structure N⁵ and valve mechanism may be further lowered so that a greater amount of liquid contacts with the bottom of the valve member and the passages Q are located in the main flow path.

With the construction illustrated in Fig. 4 when the water temperature rises to a predetermined value, the disc is softened and the pressure of the fluid acting on the underside of the valve member B forces the latter upwardly to permit the escape of hot water from the main tank. Ordinarily the temperature at which the disc thus opens will not be sufficiently high to cause the disc to melt away to any great extent but merely to permit the valve to be lifted from its seat a short distance. The escape of water through the passageway N⁴ when the valve member is thus upwardly opened is ordinarily rapid enough to prevent the heater attached to the tank from heating the water high enough to generate steam or otherwise damage the water heating system. In case an abnormal amount of heat is applied to the water heater the resultant increase in water temperature will cause complete fusion of the disc E thus permitting the valve member to open to the fullest extent.

When, however, the temperature attained in the tank is not sufficient to completely fuse the metal of the disc, only a small quantity of the metal is melted resulting in a thinning of the disc. After so operating the valve member is restored to its normally closed position by screwing the plug O inwardly to reseat the valve. Thus the valve may operate in response to temperature a number of times before it becomes necessary to replace the fusible disc. The provision of the shoulder O³ on the plug makes it impossible to hold the valve in its closed position unless the disc is in place and thus tends to make the device fool-proof.

When the valve illustrated in Fig. 4 is used, for example, between a water meter and boiler, any thermal expansion of the water causes the heated water to back up in the pipe line. Where no check valve is interposed in the line, the relief valve is not operated until the temperature of the expanding water is sufficient to cause the fusible plug to soften. In this case the portion of the heated water which would be otherwise lost in present practice backs up in the pipe main. Where, however, a check valve is inserted in the line between the relief valve and the water meter, the relief valve will be preferably provided with pressure responsive devices as shown in Fig. 3 and excessive pressures will then be relieved by the opening of the valve member B. This application is a continuation in part of my prior co-pending application, Serial No. 280,193, filed May 24, 1928.

While in accordance with the provisions of the statutes, I have illustrated and described the best forms of embodiment of my invention now known to me, it will be apparent to those skilled in the art that changes may be made in the forms of the apparatus disclosed without departing from the spirit of my invention as set forth in the appended claims and that in some cases certain features of my invention may be used to advantage without a corresponding use of other features.

Having now described my invention what I claim as new and desire to secure by Letters Patent, is:

1. A temperature controlled water relief valve comprising a casing formed with a water fluid space and having a water relief passage opening therefrom, a valve member arranged to control the flow of water through said passage and seating in the outer end of said passage, means comprising a fusible element for controlling the operation of said valve member, said fusible element being separated from said passage by a thin metal wall, and positioned on the outer side of said wall, and said passage having an enlarged portion adjacent said valve member, said fusible metal being adapted to soften and permit said valve to open under the action of heat conducted through said thin wall from the water in said space and in contact with said wall on a predetermined increase in the temperature of said water.

2. A temperature controlled relief valve adapted to be connected to a tank containing a fluid to be heated and comprising a valve member having its inner side exposed to said fluid and arranged to control the flow of fluid from said tank, means comprising a fusible element for controlling the operation of said valve member, said element being positioned on the outer side of said valve member, and means for preventing the formation of air pockets adjacent the inner side of said valve member.

3. A temperature controlled relief valve adapted to be connected to a tank containing a fluid to be heated comprising a valve body having inlet and outlet passageways formed therein, a valve member in said inlet passageway at a point spaced from the entrance end thereof and arranged to control the flow of fluid through said passageways, means comprising a fusible element for controlling the operation of said valve member, said fusible element being positioned on the outlet passageway side of said valve member, and means for preventing the formation of air pockets in said inlet passageway adjacent said valve member, said means comprising a passageway connecting the portion of said inlet passageway adjacent said valve member to said tank.

4. A temperature and pressure controlled relief valve adapted to be connected to a hot water tank and comprising a valve body formed with inlet and outlet passages and valve means comprising a valve member normally closing communication between said passages, pressure responsive means yielding to permit such communication when the pressure of the fluid entering such inlet passage rises above a normal value, a fusible element which softens and yields to permit such communication when the temperature of the fluid entering said inlet passage rises above a normal value, said element being positioned on the outlet side of said valve member and operatively engaged by said pressure responsive means and stop means rendering said pressure responsive means inoperative to oppose an opening movement of said member after a predetermined thinning of said element.

5. A temperature and pressure controlled relief valve comprising a casing formed with a fluid space, a relief port opening from said space, a valve seat at the outer end of said port, a valve member controlling said port, means normally holding said valve member against said seat comprising a follower tending to move toward said seat and a thrust block of fusible metal interposed between the follower and the valve member, and means limiting the movement of the follower toward said seat to an amount less than the thickness of said block.

6. A temperature and pressure controlled relief valve adapted to be connected to a hot water tank and comprising inlet and outlet passages formed therein, a valve member normally closing communication between said passages, and temperature and pressure responsive valve operating means including a fusible element mounted on the outlet side of said valve member, a slideable plug contacting with said fusible element, a spring contacting with said plug and arranged to normally hold said valve member in the closed position, and means for limiting the movement of said plug towards said valve member.

7. A temperature and pressure controlled relief valve adapted to be connected to a hot water tank and comprising inlet and outlet passages formed therein, a valve member normally closing communication between said passages, and temperature and pressure responsive valve operating means including a fusible element mounted on the outlet side of said valve member, a slideable plug contacting with said fusible element, a spring contacting with said plug and arranged to normally hold said valve member in the closed position, and means for limiting the movement of said plug towards said valve member, said last mentioned means comprising a stop on said plug arranged to engage a fixed portion of said valve.

8. A relief valve comprising a casing formed with a water space and a water outlet port opening from said space, a valve member controlling said port and tending to open under the action of the water pressure in said space and formed with a thin metal wall exposed to contact at its inner side with the water in said space, a fusible metal element positioned on the outer side of said valve member wall, and means including a movable follower in guided relation with said casing cooperating with said fusible element in tending to hold said valve member in its closed position, said fusible metal being adapted to soften and permit said valve to open under the action of heat conducted through said thin wall from the water in said space and in contact with said wall on a predetermined increase in the temperature of said water.

9. A relief valve comprising a casing formed with a water space and a water outlet port opening from said space, a valve member controlling said port and tending to open under the action of the fluid pressure in said space and formed with a thin metal wall exposed to contact at its inner side with fluid in said space and means normally holding said valve in its closed position comprising a movable follower in guided relation with said casing and a thrust block of fusible metal interposed between said following and said valve member wall, said fusible metal being adapted to soften and permit said valve to open under the action of heat conducted through said thin wall from the water in said space and in contact with said wall on a predetermined increase in the temperature of said water.

10. A relief valve comprising a casing formed with a fluid space and a relief port opening therefrom and having a valve seat at its outer end, a valve member controlling said port and normally engaging said seat and formed at its outer side with a bearing surface separated by a thin wall from said space, and means normally holding the valve against its seat comprising a movable follower in guided relation with said casing and a thrust block of fusible metal interposed between said follower and surface, said fusible metal being adapted to soften and permit said valve to open under the action of heat conducted through said thin wall from the water in said space and in contact with said wall on a predetermined increase in the temperature of said water.

11. A temperature and pressure controlled relief valve arranged to be connected to a hot water tank and comprising a valve body formed with communicating inlet and outlet passages therein, movable valve means normally closing communication between said passages but movable to permit such communication, and means normally preventing such movement of said valve means including a fusible plug element within said valve body and engaging with said valve means and arranged to soften and yield when the temperature of the fluid entering said inlet passage rises above a normal value, a spring, and a movable follower in guided relation with said valve body, said spring and follower acting in series with said fusible element between said valve means and valve body.

12. A temperature and pressure controlled relief valve adapted to be connected to a hot water tank and comprising a valve body formed with communicating inlet and outlet passages and a valve seat at the outlet side of said inlet passage, a movable valve member normally seated on said valve seat, means at the outlet side of said valve member for normally holding the latter against said seat comprising a spring yielding when the pressure of the fluid entering said inlet passage from said tank rises above a predetermined value, and a replaceable fusible plug element arranged in the path of movement of and in contact with said movable valve member, and stop means rendering the spring inoperative after a certain thinning of the fusible element.

13. A temperature and pressure control relief valve adapted to be connected to a hot water tank and comprising a valve body formed with communicating inlet and outlet passages and with a valve seat at the outlet side of said inlet passage and with two coaxial guideways, a movable valve member normally seated on said valve seat and engaging and guided for rectilinear movement by one of said guideways, a fusible plug element in contact with said movable valve member, a plunger element engaging and guided for rectilinear movement by the second of said guideways and engaging said fusible element, and a spring acting between the valve body and plunger and opposing the opening movement of said valve member through said plunger and fusible element and adapted to yield and permit the valve member to move from its seat when the pressure of fluid entering said inlet passage from said tank rises above a predetermined value.

14. A temperature and pressure controlled relief valve adapted to be connected to a hot water tank and comprising a valve body formed with inlet and outlet passages and a port connecting said passages, valve mechanism normally closing said port and subjected to a port opening adjustment tendency by the pressure of fluid in said inlet passage, and means normally overbalancing said tendency comprising a spring which yields to permit a port opening adjustment of said mechanism by said pressure when the latter is above normal, a fusible element which when heated softens and yields and thereby permits a port opening adjustment of said mechanism by said pressure when the latter is not in excess of normal, and an endwise movable plunger interposed between said spring and fusible element and means for rectilinearly guiding the plunger.

15. A temperature and pressure controlled relief valve adapted to be connected to a hot water tank and comprising a valve body formed with inlet and outlet passages and a port connecting said passages, a valve normally closing said port and subjected to a port opening tendency by the pressure of fluid in said inlet passage, and means located on the outlet side of said port normally restraining said tendency comprising a spring which yields to permit a port opening adjustment of said valve by said pressure when the latter rises above a normal value, a fusible element located at the outlet side of said port and adapted when heated, to soften and thereby yield to permit a port opening adjustment of said valve by said pressure when the latter is not in excess of normal, and an endwise movable plunger interposed between said spring and fusible element and means for rectilinearly guiding the plunger.

LUTHER D. LOVEKIN.